Dec. 7, 1926.
G. H. RENZ
1,609,309
TAKE-UP FOR ELECTRIC LAMP AND OTHER FLEXIBLE CORDS
Filed August 6, 1925
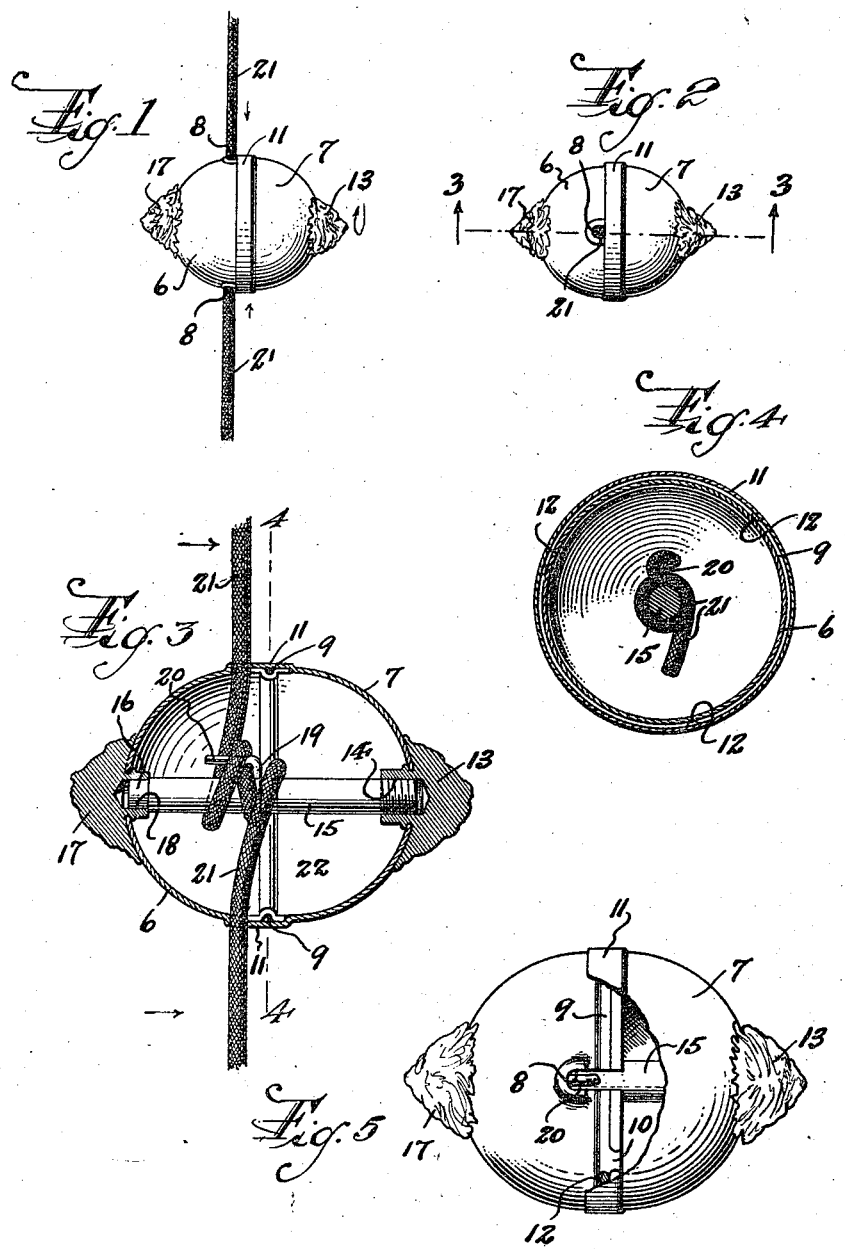
INVENTOR.
George H. Renz.
BY
Fraentzel and Richards,
ATTORNEYS.

Patented Dec. 7, 1926.

1,609,309

UNITED STATES PATENT OFFICE.

GEORGE H. RENZ, OF NEWARK, NEW JERSEY.

TAKE-UP FOR ELECTRIC-LAMP AND OTHER FLEXIBLE CORDS.

Application filed August 6, 1925. Serial No. 48,685.

This invention has reference to an improved take-up device for adjusting the length of electric lamp and other flexible cords; and the invention relates, more particularly, to a novel manipulable mechanical device for application to a lamp cord or other flexible cord, whereby the latter may be manipulated to adjust the length thereof.

The invention has for its principal object to provide a compact, simple and easily manipulated device of neat and pleasing appearance which may be applied to a length of flexible cord, such, e. g., as an electric lamp cable, without necessity of interrupting the continuity of the same or interfering with its functions in any way; and, when so applied, being adapted to provide a means for winding the body of the cord upon itself, or unwinding the same, to adjust the length thereof as may be desired. To this end the novel take-up device comprises a pair of separable shells having their open ends interengaged for rotation one upon the other, one of said shells having notched openings for leading the cord into and out of the internal chamber provided by the joined shells, and one of said shells having affixed thereto a spindle for extension through said internal chamber, said spindle having means for engaging the cord therewith whereby rotation of the spindle in one direction or the other will wind upon or unwind from the latter said cord.

Other objects of this invention, not at this time more particularly enumerated, will be clearly understood from the following detailed description of the same.

The invention is clearly illustrated in the accompanying drawings, in which—

Figure 1 is a side elevation of the novel take-up device operatively applied to an electric lamp cable; Figure 2 is a top plan view of the same; Figure 3 is a vertical longitudinal section of the same, taken on line 3—3 in Figure 2, but drawn on an enlarged scale; Figure 4 is a transverse section, taken on line 4—4 in Figure 3; and Figure 5 is a top plan view with a portion of one shell broken away to show the underlying construction.

Similar characters of reference are employed in all of the hereinabove described views, to indicate corresponding parts.

Referring now to said drawings, the reference character 6 indicates one shell or casing member and 7 the other shell or casing member. Said shells or casing members are preferably of hollow substantially semi-spherical form. One of said shell or casing members, as 6, is provided in its marginal edge portion with a pair of indented notches or slotted openings 8, which are diametrically opposed one to the other. This same shell or casing member 6 is also provided, adjacent to its free marginal edge, and on its external side, with a depressed annular groove or channel 9. The outer side of said groove or channel 9, which is toward the free edge of the shell or casing member, is interrupted at desired intervals to provide laterally and inwardly extending ways or gate openings 10 which lead into said groove or channel 9.

The other or opposite shell or casing member, as 7, is provided at its free marginal periphery with an outwardly offset annular flange 11, the same being provided with inwardly directed tits or lugs 12 spaced apart at intervals corresponding to the spaced intervals of the ways or gate openings 10 leading into the annular groove or channel 9 of the shell or casing member 6.

One of said shells or casing members, as 7, is provided with a bushing 13 centrally fixed in its wall. Said bushing 13 is provided at its inner end with an internally screw threaded socket 14 to receive the threaded end of a transversely projecting spindle 15, whereby the latter is affixed to said shell or casing member 7. It will be understood that any other method of or means for affixing said spindle 15 to the shell or casing member 7 may be employed. The outer or free end of said spindle 15 is preferably provided with a journal portion 16 of reduced diameter. The other shell or casing member, as 6, is also provided with a bushing 17 centrally fixed in its wall, and the said bushing 17 is provided in its inner end with a smooth bore bearing socket 18. The bushings 13 and 17 of the respective shells or casing members may be provided at their outer or exposed ends with any form of ornamental embellishment desired. Secured to said spindle 15 is a cord engaging element preferably in the form of a hook or clip having its free end portion disposed substantially parallel to and spaced outwardly from the side of said spindle. In one form, as shown, in the drawings, this hook or clip comprises a shank 19 imbedded in or suitably secured to the spindle to project laterally therefrom, said shank 19 having a longitudinal hook or clip arm 20 spaced from and substantially parallel to the side of the spindle, with its free end projecting toward the free end of said spindle.

In assembling the device in operative relation to and with a flexible cord 21 to be served thereby, said cord 21 is inserted in the notches or slotted openings 8 of the shell 6, so as to extend diametrically across the open side of the latter. The shells or casing members 6 and 7 are thereupon joined together in the following manner. Said shells or casing members 6 and 7 are arranged with their open sides opposed one to the other, and then closed together. In closing the shells together, the hook or clip arm 20 is passed over the diametrically extended cord 21, so that the latter is engaged between said spindle 15 and the hook or clip arm 20.

When moving the shells together, the tits or lugs 12 of the shell 7 are registered with the ways or gate openings 10 leading into the groove or channel 9 of the shell 6, whereby the former are caused to enter the groove or channel 9 as the annular flange 11 of the shell 7 is telescopingly closed over the marginal edge portions of the shell 6. When thus arranging the shells in interengaged relation, the journal portion 16 of the spindle 15 is at the same time entered in the bearing socket 18 of the bushing 17 connected with the shell 6, so that the spindle is transversely disposed in extension through the chamber 22 provided by the hollow interiors of said shells or casing members. A slight rotation of one shell or casing member relative to the other will enter the tits or lugs 12 of one shell in the groove or channel 9 of the other, thus interlocking said shells together in such manner that the same are free to rotate one upon the other in either direction. By rotating the spindle carrying shell on the opposite shell in one direction, the cord 21 will be caused to double wind itself thereupon, thus shortening the length of the cord to the extent desired. By rotating the spindle carrying shell on the opposite shell in the other direction, the cord 21 will be caused to unwind itself from the spindle so that its useful length may be increased to the desired extent. It will thus be evident that my novel device affords an easily and simply manipulated take-up or flexible cord adjusting means, which is of very simple construction, little likely to get out of order, and cheap to produce, while at the same time providing a neat and pleasing appearance.

It will be understood that in its broader aspects my invention is not intended to be limited to the specific construction of means herein described and illustrated in the drawings for rotatably interengaging or coupling the shells or casing members 6 and 7, since many mechanical variations of such coupling means may be utilized; nor in other respects do I limit myself to the exact mechanical detail construction of the various devices and parts as above described and as shown in the drawings, except as defined in the appended claims.

I claim:—

1. A take-up device for flexible cords, comprising a pair of opposed hollow shells rotatably interengaged one with the other and providing an internal chamber, one of said shells having a bushing centrally affixed to its wall, a spindle secured to the inner end of said bushing to extend through said internal chamber, the other of said shells also having a bushing centrally affixed to its wall, said latter bushing having a smooth bore bearing socket in its inner end to receive and rotatably support the free end of said spindle, one of said shells also having diametrically opposed openings in its walls for leading a flexible cord through said internal chamber at substantially right angles to the extension of said spindle, and said spindle having means for engaging the interiorly disposed portion of said cord to cause the latter to wind around said spindle upon rotation thereof, said latter means comprising a shank affixed to and projecting laterally from said spindle, and a hook arm extending substantially longitudinally of and spaced from said spindle, the free end of said hook arm projecting toward the free end of said spindle.

2. A take-up device for flexible cords, comprising a pair of opposed substantially semi-spherical shells, one of said shells having adjacent to its free edge an annular groove, the other of said shells having an outwardly off-set annular flange adapted to be telescopically engaged over the grooved portion of said opposite shell, said flange having inwardly projected tits engageable in said grooved portion of said opposite shell whereby said shells are rotatably but separably interengaged one with the other, said grooved shell having diametrically opposed indented slots in the free marginal portions thereof whereby a flexible cord may be diametrically extended through the interior of said joined shells, one of said shells having a spindle fixed for rotation therewith and alined with the axis of rotation thereof, and said spindle having means for engaging said cord.

3. A take-up device for flexible cords, comprising a pair of opposed substantially semi-spherical shells, one of said shells having adjacent to its free edge an annular groove, the other of said shells having an outwardly off-set annular flange adapted to be telescopically engaged over the grooved portion of said opposite shell, said flange having inwardly projected tits engageable in said grooved portion of said opposite shell whereby said shells are rotatably but separably interengaged one with the other, said grooved shell having diametrically opposed indented slots in the free marginal portions thereof whereby a flexible cord may be diametrically extended through the interior of said joined shells, one of said shells having a spindle fixed for rotation therewith and alined with the axis of rotation thereof, and said spindle having means for engaging said cord, said latter means comprising a shank affixed to and projecting laterally from said spindle, and a hook arm extending substantially longitudinally of and spaced from said spindle, the free end of said hook arm projecting toward the free end of said spindle.

In testimony, that I claim the invention set forth above I have hereunto set my hand this 1st day of August, 1925.

GEORGE H. RENZ.